United States Patent

[11] 3,582,106

| [72] | Inventor | Johan H. Keijzer |
| | | Brustem, Belgium |
| [21] | Appl. No. | 743,244 |
| [22] | Filed | July 8, 1968 |
| [45] | Patented | June 1, 1971 |
| [73] | Assignee | Monroe Belgium N.V. |
| | | St. Truiden, Belgium |
| | | Continuation-in-part of application Ser. No. 625,146, Mar. 22, 1967, now Patent No. 3,466,055. |

[54] VEHICLE LEVELING SYSTEM
21 Claims, 9 Drawing Figs.

[52] U.S. Cl. .................................................. 280/124, 267/64
[51] Int. Cl. .................................................. B60g 21/06
[50] Field of Search .................................................. 280/6, 6.1, 6 H, 124 F; 267/64, 64 B

[56] References Cited
UNITED STATES PATENTS

| 3,156,481 | 11/1964 | Dangauthier | 280/6 |
| 3,389,903 | 6/1968 | Schmid | 267/64 |
| 3,149,829 | 9/1964 | Baum | 267/64B |
| 3,149,830 | 9/1964 | Broadwell | 280/124F |

*Primary Examiner*—Philip Goodman
*Attorney*—Harness, Dickey & Pierce

ABSTRACT: A leveling system comprising a plurality of vehicle suspension units interposed between the spring and unsprung portions of an automotive vehicle and adapted to control the relative attitude between said vehicle portions; a combination fluid-air spring unit and a fluid leveling valve device operatively associated with each of the suspension units for controlling selective actuation thereof; fluid circuit means communicating the suspension units at the front and/or rear end of the vehicle and the units along the same side of the vehicle; a fluid reservoir and pumping means for transmitting actuating fluid to the suspension units; and load compensating means interposed between the suspension units on the same side of the vehicle for controlling the actuation of the suspension units at the front and rear of the vehicle in response to unequal load distribution.

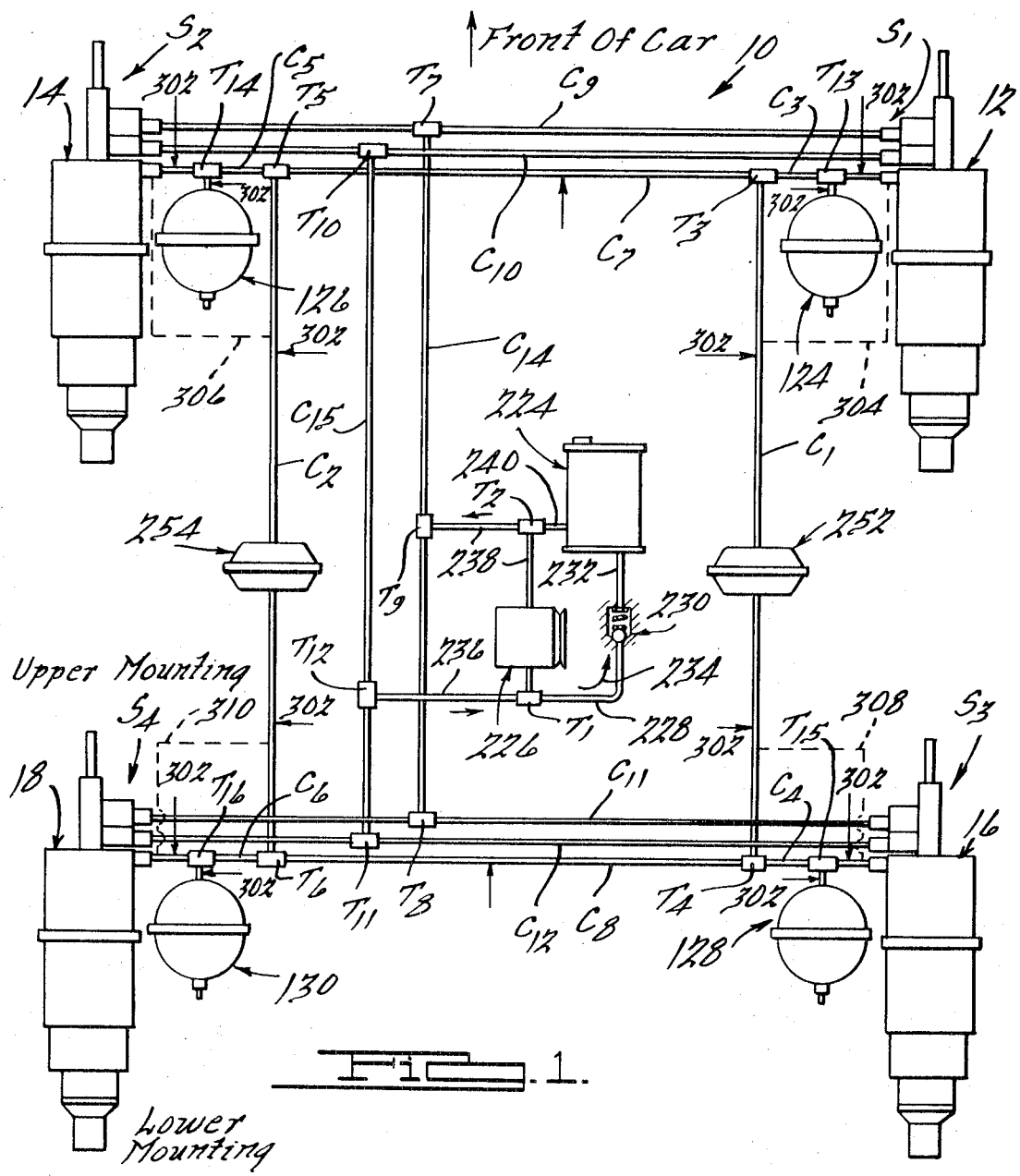
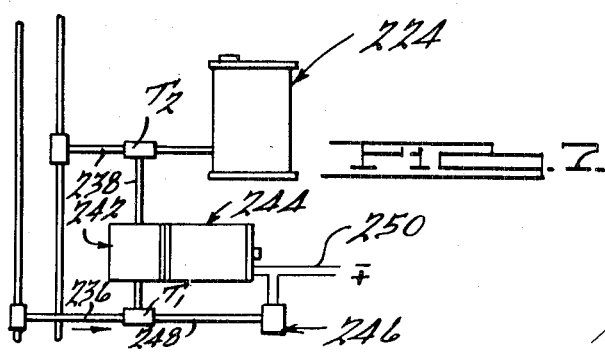

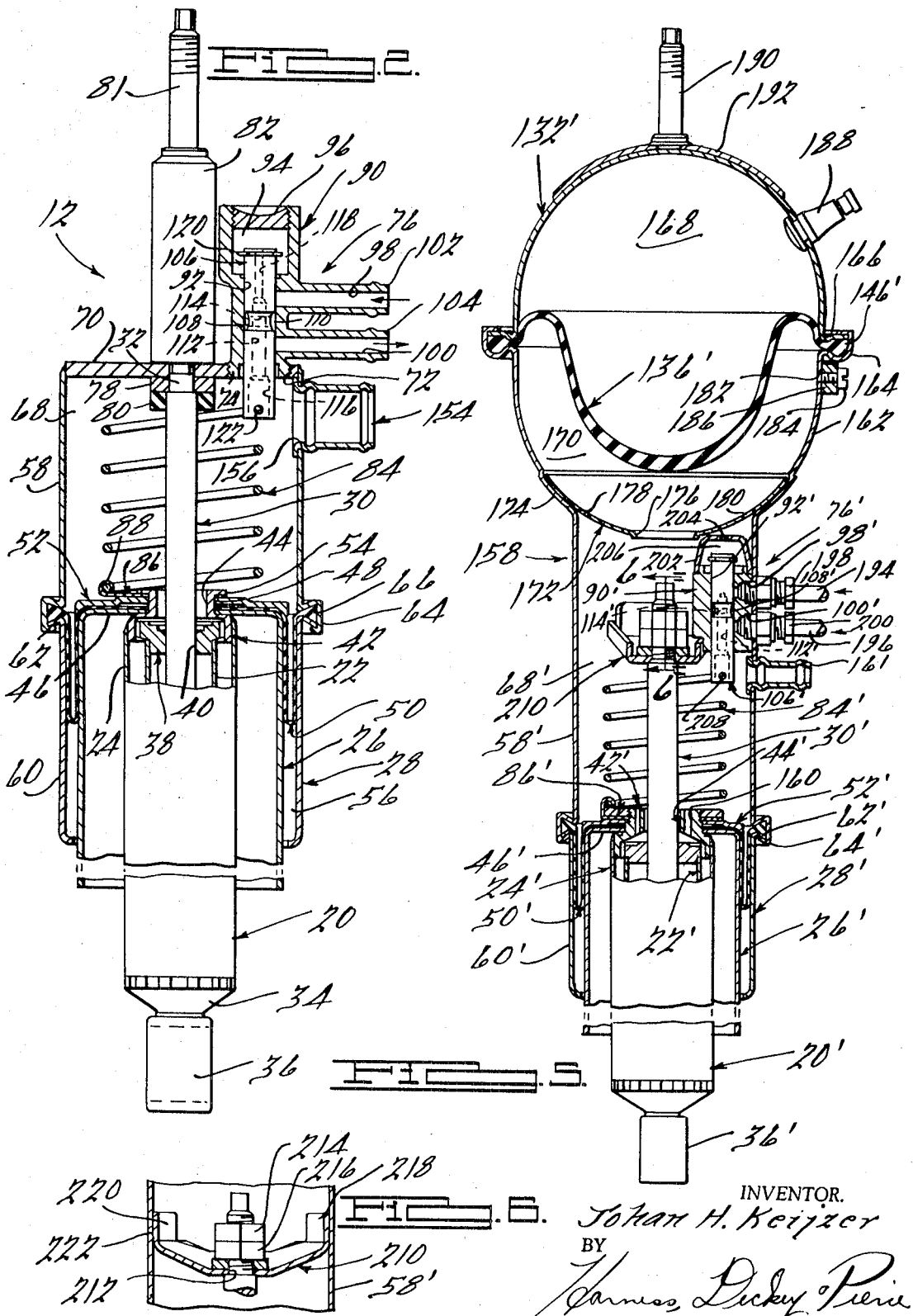

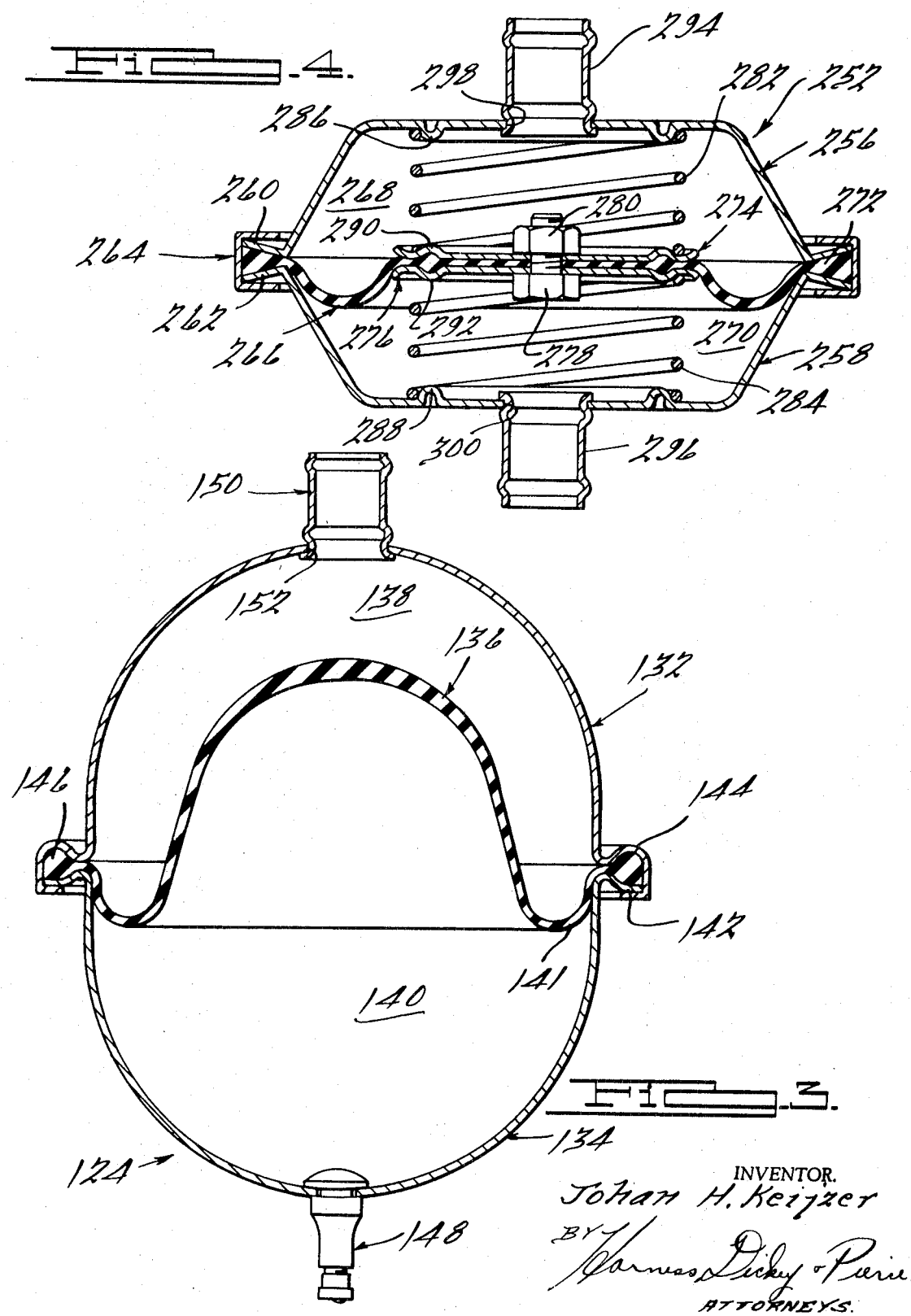

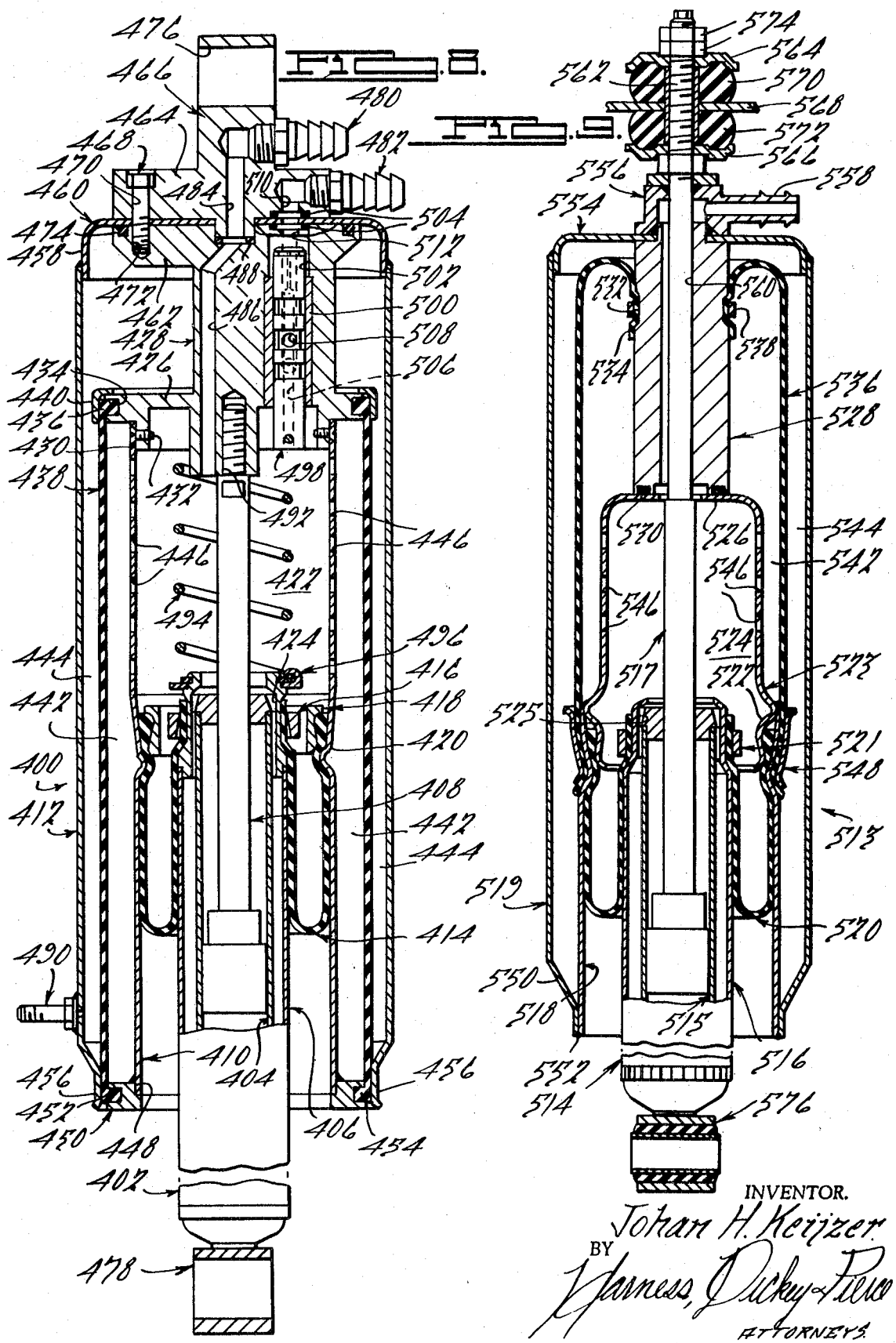

VEHICLE LEVELING SYSTEM

This application is a continuation-in-part of U.S. Pat. application Ser. No. 625,146, filed Mar. 22, 1967, for Vehicle Leveling System, now Pat. No. 3,466,055 and assigned to the assignee of the instant application.

The purpose of the above abstract is to provide a nonlegal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

BACKGROUND OF THE INVENTION

Generally speaking, there are three different types of suspension systems currently being used on automotive vehicles. The first type, and that which is in widest use, is the conventional suspension system comprising some type of spring mechanism such as leaf springs, coil springs, torsion bars, and some types of springs fabricated of rubber or some other resilient composition. By and large, such spring suspension systems are not provided with any type of leveling devices for selectively controlling the attitude between the sprung and unsprung portions of the vehicles, nor are such systems provided with any means interconnecting the forward and rear spring means to control the attitude of the vehicle body under different loading conditions.

The second type of suspension system which has been used on automotive vehicles is generally categorized as an air suspension system. Such systems incorporate various types of air cylinders which are interposed between the sprung and unsprung portions of vehicles and are adapted to be selectively inflated and deflated in accordance with various existing loading conditions. By their very nature, such air systems require relatively expensive air compressing devices and have been objectionable due to the fact that a large quantity of air has had to be displaced in order to accommodate different loading conditions. Moreover, such systems have been undesirable in that the atmospheric air pumped into the systems has almost always been contaminated with foreign material including at least a certain amount of moisture or condensation which, under different ambient temperature conditions, has tended to accumulate in the system, resulting in freezing of the air valves and the like, and requiring periodic draining.

The third type of suspension system which has heretofore been known and used is the hydraulic system which utilizes a plurality of hydraulically actuated and piston and cylinder devices for varying the attitude of a vehicle body relative to the unsprung portion thereof. Although such hydraulic suspension units have been highly desirable from the standpoint that considerably less hydraulic fluid is required than air is needed in comparable air suspension units, such hydraulic suspension systems have remained undesirable due to the relatively high hydraulic pressures, i.e., approximately 2,000 p.s.i., exerted against the various pumps, hydraulic conduits and suspension units. As a result of these high pressures, such hydraulic suspension systems have required relatively complicated valving, pumps, and have encountered frequent sealing problems, resulting in expensive maintenance due to excessive wear and frequent loss of hydraulic pressure.

It is generally agreed between experts in the vehicle suspension arts that an ideal suspension system for an automotive vehicle is characterized by a relatively low spring rate and a constant vehicle body height under different loading conditions. This, of course, provides for a uniform, comfortable ride, without detracting from the esthetic appearance of the vehicle. Some suspension systems heretofore known have utilized relatively large auxiliary units on the rear ends of the vehicle units to provide for comfortable riding conditions under heavy leading conditions, but the appearance of such vehicles was adversely affected due to the fact that the rear ends of the vehicle bodies would frequently be disposed substantially above the rear axles under low load conditions.

In order to achieve a vehicle leveling system which is as nearly ideal as is economically feasible, the present invention generally contemplates the use of the following features. First, the leveling system of the present invention incorporates the use of a gas, preferably air, as a spring element in order to provide for a progressive spring rate, flexibility and adaptability of design, and relatively low costs. Next, the present invention incorporates hydraulic fluid, preferably oil of a suitable viscosity, as a leveling element, since the volume of such a fluid required to level a vehicle body is substantially less than the volume of a compressible gas required to accomplish a comparable leveling job. Moreover, pumping means for transmitting such a fluid to the various suspension units are considerably cheaper than air or gas compressor means heretofore utilized in air suspension systems. The leveling system of the present invention next contemplates the use of a direct acting suspension unit, i.e., acting directly against the sprung portion of the vehicle, by virtue of the fact that this design results in lighter and more economical mounting structures, easier installation, and lower internal fluid pressures. The present invention also contemplates the use of a relatively low pressure system which enables the use of substantially simple stampings instead of forgings and machined parts, thereby reducing and in some cases obviating any machining operations and considerably simplifying assembly of the system. Furthermore, such a low pressure system enables the use of membranes or diaphragms instead of relatively expensive fluid seals, whereby to eliminate static friction and also minimize expenses in assembly of the system. Finally, the present invention contemplates the use of a shock absorber system in combination with associated spring elements, which results in reduced loading on either of the two suspension components and a corresponding reduction of any excessive structural forces (couples) on the suspension arms.

SUMMARY OF THE INVENTION

This invention relates generally to a new and improved leveling system adapted to automatically maintain the body portion of a vehicle in a substantially level attitude regardless of the loading conditions imposed thereon or the particular road conditions over which the vehicle is traveling. More particularly, the present invention relates to a vehicle leveling system of the above character incorporating a closed hydraulic system communicating hydraulic fluid to each of a plurality of suspension assemblies operatively disposed at either or both ends of the vehicle for controlling the relative attitude between the sprung and unsprung portions of the vehicle and adapted to provide for improved riding conditions by maintaining a minimum spring rate.

With the foregoing in mind, it is a general object of the present invention to provide a new and improved vehicle leveling system adapted to overcome the previously mentioned problems associated with heretofore known and used vehicle leveling systems.

It is a more particular object of the present invention to provide a new and improved leveling system which provides for a more comfortable ride by maintaining a relatively low spring rate, while automatically keeping the vehicle body at a predetermined riding height.

It is another object of the present invention to provide a new and improved leveling system of the above character which does not require any separate mechanical connections between the vehicle axle and the leveling valve means of the system which might be subject to maladjustment and wear.

It is another object of the present invention to provide a new and improved leveling system of the above character which incorporates a closed hydraulic system, thereby obviating the need for any expensive fluid seals and the attendant possibility of fluid leakage.

It is still another object of the present invention to provide a new and improved leveling system of the above character which includes pump means adapted to be mechanically driven by the vehicle engine or which, alternatively, may be driven by means of an auxiliary electric motor.

It is a further object of the present invention to provide a leveling system of the above character which includes relief valve means for maintaining the internal hydraulic pressure within predetermined limits.

It is another object of the present invention to provide a leveling system of the above character wherein the individual suspension units thereof may comprise unitary assemblies consisting of combination suspension units and spring units, or, alternatively, have each of the spring units remotely located from its associated suspension unit.

It is a further object of the present invention to provide a new and improved vehicle leveling system of the above character which, after initial assembly and adjustment, will be virtually service free.

It is yet another object of the present invention to provide a new and improved vehicle leveling system of the above character wherein the individual spring units thereof may be preloaded to provide any desired spring rate, whereby the leveling system will find universality of application on virtually every make and design of automotive vehicle.

It is another object of the present invention to provide a new and improved leveling system of the above-described type which may be applied to either or both the forward and rear axles of a vehicle, and which may be provided with auxiliary load compensating means for minimizing changes in attitude of the vehicle body during heavily loaded conditions.

It is still another object of the present invention to provide a new and improved leveling system of the above character comprising a plurality of separable features, the particular number of which to be operatively installed on an automotive vehicle depending upon the weight and design of the vehicle, the desired degree of comfort in vehicle ride, and the investment which the vehicle operator is willing to make in improving the suspension of the vehicle.

It is still a further object of the present invention to provide a new and improved leveling system of the above character wherein the suspension units at the opposite ends of each axle may be interconnected to minimize any rolling movement of the vehicle body caused by irregularities in the surface of the roads over which the vehicle traverses.

It is another object of the present invention to provide a vehicle leveling system of the type hereinabove described wherein the suspension units at the front and rear ends of the vehicle along the same sides thereof may be interconnected to minimize any pitching movement of the vehicle body while the vehicle traverses any surface irregularities in the road.

It is still another object of the present invention to provide a new and improved leveling system of the above character which is entirely automatic and stable in operation.

It is a further object of the present invention to provide a new and improved leveling system of the above character which is durable in operation and may be easily installed on an automotive vehicle.

It is yet another object of the present invention to provide a new and improved vehicle leveling system of the above type that is of a relatively simple design, consists of readily available component parts, and is economical to commercially manufacture.

Other objects, features and advantages of the present invention will become apparent from the following detailed description, taken in conjunction with the accompanying drawings.

BRIEF DESCRIPTION OF THE DRAWINGS

FIG. 1 is a schematic illustration of a preferred embodiment of the leveling system of the present invention;

FIG. 2 is an enlarged longitudinal cross-sectional view of one of the suspension units incorporated in the leveling system shown in FIG. 1;

FIG. 3 is a longitudinal cross-sectional view of one of the spring units incorporated in the leveling system shown in FIG. 1;

FIG. 4 is a longitudinal cross-sectional view of one of the load compensating devices incorporated in the leveling system shown in FIG. 1;

FIG. 5 is a longitudinal cross-sectional view of an alternate embodiment of the present invention showing one of the suspension units and spring units combined in a unitized assembly;

FIG. 6 is a fragmentary cross-sectional view taken substantially along the line 6–6 of FIG. 5;

FIG. 7 is a schematic illustration of an alternate means for supplying hydraulic actuating fluid to the leveling system illustrated in FIG. 1;

FIG. 8 is a longitudinal cross-sectional view similar to FIG. 5 and illustrates yet another embodiment of the present invention; and FIG. 9 is a longitudinal cross-sectional view of still a further embodiment of the present invention.

DESCRIPTION OF THE PREFERRED EMBODIMENT

For convenience of description, the terms "upper," "lower," "front," "rear," and words of similar import will have reference to the various assemblies of the leveling system of the present invention described hereinafter in detail. Likewise, the terms "inner," "outer," and derivatives thereof will have reference to the geometric center of such assemblies and the various component parts thereof.

Generally speaking, the leveling system of the present invention comprises a plurality of separate but cooperative suspension assemblies each comprising a suspension unit and an associated spring unit. The suspension units are adapted to be interposed between the sprung and unsprung portions of an automotive vehicle for purposes of supporting, for example, the vehicle body on the front and/or rear axles of the vehicle. The suspension assemblies are adapted to operate in pairs, with either one or two pairs of assemblies being provided on a vehicle. For example, a pair of suspension assemblies may be mounted on the rear axle of a vehicle for purposes of supporting the rear end of the vehicle body thereon. Alternatively, a pair of the suspension assemblies may be mounted on the front axle of the vehicle for supporting the front end of the vehicle body thereon. Finally, a pair of the suspension assemblies may be mounted on both the front and rear axles of a vehicle for operatively supporting the entire vehicle body.

Each of the suspension assemblies is provided with a novel leveling valve mechanism which is communicable with a central source of pressurized hydraulic actuating fluid and is adapted to function to selectively communicate hydraulic fluid to and from the assemblies to automatically level the sprung portion of the vehicle regardless of the existing load and road conditions. As will later be described, the suspension assemblies are adapted to be incorporated in a variety of different types of applications or hydraulic circuits, either with or without the automatic leveling valves.

Referring now in detail to FIG. 1 of the drawings, a vehicle leveling system 10, in accordance with a preferred embodiment of the present invention, is shown as comprising four separate, but cooperative suspension assemblies $S_1$, $S_2$, $S_3$ and $S_4$ which are adapted to be located one adjacent each of the four wheels of an automotive vehicle (not shown). The suspension assemblies $S_1$—$S_4$ comprise identical suspension units, 12, 14, 16 and 18, respectively, as well as identical cooperative spring units hereinafter to be described. In a preferred use of the present invention, the suspension units 12—18 are adapted to be interposed between the vehicle body and its associated supporting axles in place of the shock absorbers which are normally provided on automotive vehicles. Due to the fact that the suspension units 12—18 are identical in construction and operation, there hereinafter described detailed construction of the suspension unit 12, and the various component parts thereof, will apply to each of the other units 14, 16 and 18.

As best seen in FIG. 2, the suspension unit 12 comprises a conventional telescopic, double acting shock absorber 20 having an internal pressure cylinder 22 which is enclosed within an outer tube 24 and is surrounded at the upper end thereof by radially inner and outer cylindrical housings 26 and 28, respectively. As illustrated, the radially inner housing 26 is fixedly secured to the shock absorber unit 20, while the housing 28 is telescopically movable relative to the housing 26. The shock absorber 20 is provided with a reciprocal piston rod 30, the upper end portion 32 of which is adapted to be fixedly secured to the upper end of the housing 28, as will be described. The lower end of the shock absorber 20 is closed by an end cap 34 which is preferably connected to a suitable portion of the vehicle's front axle, such as by a ringlike attaching member 36. The upper end of the pressure cylinder 22 is closed by a piston rod guide member 38 that defines a central aperture 40 which slidingly and sealingly engages the periphery of the piston rod 30. The outer tube 24 is connected at its upper end to an annular collar member 42 which extends around the guide member 38 and defines a central opening 44 that is slightly larger in diameter than the piston rod 30 and is arranged coaxially thereof. The upper end of the inner housing 26 is formed with a radially inwardly extending upper end portion 46 which is received within an annular channel 48 extending around the outer periphery of the collar member 42.

Clampingly engaged with the top of the end portion 46 is the inner periphery of a flexible membrane or diaphragm member 50 which is preferably fabricated of synthetic rubber or other material that is impervious to oil or other actuating fluid which may be used in the leveling system 10. The inner periphery of the diaphragm member 50 is secured to the top of the portion 46 by means of an annular clamping plate 52 which is attached to the upper end of the housing 26 by means of a radially outwardly extending flange portion 54 formed on the upper end of the collar member 42. As shown in FIG. 2, the diaphragm member 50 is of substantial radial dimension such that when the housing 28 is disposed in the longitudinal or axial position illustrated in this Figure, the diaphragm member 50 hangs downwardly within an annular chamber 56 defined between the outer periphery of the housing 26 of the inner periphery of the housing 28.

The housing 28 comprises upper and lower sections 58 and 60, respectively, with the upper end of the housing section 60 being formed with a radially outwardly and downwardly extending flange portion 62 and the lower end of the housing section 58 being formed with a generally C-shaped locking portion 64 which is fixedly engaged with the portion 62 in a manner so as to rigidly secure the housing sections 58, 60 to one another. The radially outer periphery of the diaphragm member 50 is formed with an enlarged thickness or sealing portion 66 which is adapted to be clampingly engaged between the housing portions 62 and 64 and thereby provide gasket means to prevent any fluid leakage at the juncture of the housing sections 58 and 60. It will be seen that the diaphragm member 50 separates or provides partition means between the annular chamber 56 and a generally cylindrical chamber 68 defined within the upper end of the housing section 58. As will later be described, the chamber 68 is adapted to be filled with hydraulic fluid which is communicable with the interior of the shock absorber 20 through the opening 44, with the result that the shock absorber 20 uses the same actuating fluid as the leveling system 10.

The upper end of the housing section 58 is closed by a radially extending cover plate 70 which defines the upper end of the chamber 68 and is adapted to be fixedly secured to the housing section 58, as by welding or the like. The cover plate 70 is formed with an internally threaded opening 72 within which a housing section 74 of a later to be described automatic leveling valve assembly 76 is operatively mounted. The upper end portion 32 of the piston rod 30 is rigidly secured to the cover plate 70 and hence to the housing 28 by means of an annular collar member 78 disposed on the lower side of the plate 70, an annular rubber or similar resilient-type bumper member 80 being mounted on the lower side of the member 78 and adapted to be engaged by the upper end of the collar member 42 when the suspension unit 12 is deenergized or in a contracted condition. An upwardly extending mounting stud 81 is rigidly secured to the upper side of the cover plate 70 and is adapted to be fixedly attached to a suitable portion of the vehicle body. A cylindrical space member 82 is mounted on the stud 81 to facilitate mounting the suspension unit 12 and to maintain spacing between the vehicle body and the automatic leveling valve assembly 76.

A helical coil spring 84 is disposed within the chamber 68 circumjacent the piston rod 30. The spring 84 is fixedly secured at its lower end to the collar member 42 by means of an annular retaining member 86 which is secured between the upper side of the plate 52 and the flange 54, the retaining member 86 having a radially outwardly extending portion 88 which is attached to the lower end of the spring 84. The spring 84 is of a length such that when the housing 28 is disposed in the longitudinal position shown in FIG. 2, the upper end of the spring 84 is spaced slightly below the lower side of the plate 70. The spring 84 is adapted to function in regulating the height of the vehicle body with respect to the unsprung portion of the vehicle, as will later be explained in the description of the operation of the suspension unit 12.

Referring now in detail to the construction of the leveling valve assembly 76, as best seen in FIG. 2, the assembly 76 comprises a substantially hollow housing 90 which defines a central longitudinally extending bore 92 terminating at its upper end in an enlarged diameter damping chamber 94 that is closed by a threadably mounted plug 96. As will later be described, for certain types of applications wherein the suspension unit 12 is not provided with the automatic leveling valve assembly 76, the threaded opening 72 is adapted to be closed by means of any suitable closure plug, such as the plug 96, whereby to seal the upper end of the chamber 68. The bore 92 is communicable at its lower end with the interior of the chamber 68 and is also communicable with a pair of radially outwardly extending bores 98 and 100 defined by a pair of tubular or cylindrical housing sections 102 and 104, respectively. Reciprocally mounted within the bore 92 is a generally cylindrical-shaped spool valve member 106 which is formed with a reduced diameter medial portion 108 that defines an annular fluid passage 110 with the inner periphery of the bore 92. The valve member 106 is also formed with a longitudinally extending central bore 112 which is adapted to communicate with the passage 110 through a diametrically extending bore 114. The lower end of the bore 112 is communicable with the interior of the chamber 68 through an enlarged diameter bore portion 116 formed at the lower end of the valve member 106, while the upper end of the bore 112 is communicable with the interior of the chamber 94 through a relatively small diameter orifice portion 118. The upper end of the valve member 106 is provided with a snapring 120 or other suitable means for limiting downward movement of the member 106 within the bore 92, and the lower end of the member 106 is adapted to be fixedly secured to the upper end of the helical spring 84 by having the uppermost coil or convolution thereof extend through a suitable aperture 122 in the lower end of the member 106. The purpose of having the valve member 106 connected to the helical coil spring 84 is to assure that the member 106 will move longitudinally within the bore 92 only in response to relatively large changes in attitude of the vehicle body relative to the unsprung portions of the vehicle, as will later be described in detail.

The valve member 106 is designed such that the outer periphery thereof closes the inner ends of the bores 98 and 100 when the member 106 is disposed in the position shown in FIG. 2; however, at such time as the member 106 moves upwardly or downwardly within the bore 92 such that the passage 110 is in registry with either of the bores 98 or 100, said bore will be communicable through the bores 114 and 112 in the valve member 106 with the chamber 68. It will be seen that when the passage 110 is aligned with one of the bores 98, 100, the other of said bores will be closed by the valve member 106. Accordingly, when the valve member 106 is moved to an upper position, only the bore 100 is communicable with the chamber 68, and when the member 106 is disposed in a lower position, only the bore 98 is communicable with the chamber 68, and at no time is there any communication between bores 98 and 100 through the bore 92. As will later be described, the bores 98 and 100 are adapted to communicate with an associated source of pressurized hydraulic actuating fluid, whereby reciprocation of the spool member 106 will selectively communicate hydraulic actuating fluid to and from the chamber 68. As will later be described in detail, by virtue of the relatively smaller diameter of the orifice portion 118 communicating the bore 114 with the chamber 94, the chamber 94 will normally be filled with actuating fluid, which fluid will act as a damping means for controlling the longitudinal movement of the valve member 106 within the bore 92.

As best seen in FIG. 1, the suspension assemblies $S_1$, $S_2$, $S_3$ and $S_4$ comprise spring units 124, 126, 128 and 130, respectively, which, depending upon the particular installation, may be operatively mounted directly adjacent the suspension units 12, 14, 16 and 18, or, alternatively, at some remote location on the vehicle. The spring units 124—130 are preferably identical in construction and operation so that a detailed description of the spring unit 124 will apply to each of the other units 126, 128 and 130.

As shown in FIG. 3, the spring unit 124 generally comprises a pair of cup-shaped confronting housings 132 and 134 and a flexible membrance or diaphragm member, generally designated 136, extending therebetween and dividing the interior of the spring unit 124 into separate upper and lower chambers 138 and 140. In a preferred construction, the diaphragm member 136 is formed with a reduced thickness portion 141 at an intermediate portion thereof and is fabricated of the same fluid impervious material as the aforedescribed diaphragm 50. The housing section 134 is formed with a radially outwardly extending flange section 142 at the upper end thereof, and the housing section 132 is formed with a generally C-shaped retaining section 144 around the lower end thereof, the sections 142 and 144 being clampingly engaged with one another in the manner shown in FIG. 3 such that the housing sections 132, 134 comprise a single unitized assembly. The outer periphery of the diaphragm member 136 is formed with an enlarged thickness or sealing portion 146 which is clampingly secured between the housing sections 142 and 144, whereby to provide gasket or sealing means at the juncture of the housing sections 132, 134. The diaphragm member 136 is somewhat larger in diameter than the interior of the housing sections 132, 134 and thus is adapted to flex upwardly and downwardly within the spring unit 124, whereby to enlarge or decrease the relative volumes of the chambers 138 and 140, as shown in FIG. 3.

In operation of the suspension assembly $S_1$, the chamber 140 is adapted to be preloaded or charged with a compressed gas, preferably air, by means of a valve assembly 148 mounted on the lower end of the housing section 134. In a typical application, this preloaded pressure is in the order of 70 p.s.i., but may vary from one application to another. The housing section 132 is provided with a fluid fitting 150 mounted in a suitable opening 152 and adapted to be communicable through fluid circuit means later to be described with a fluid fitting 154 which is mounted in an opening 156 in the side of the housing section 58 of the suspension unit 12 with the result that the chamber 68 in the suspension unit 12 is communicable with the chamber 138 in the spring unit 124. The chambers 68 and 138 are intended to contain a preselected volume of a suitable hydraulic actuating fluid, such as oil, the quantity of fluid being fixed in the case wherein the automatic leveling valve assembly 76 is omitted from the suspension unit 12, and being variable when the valve assembly 76 is provided on the suspension unit 12. In the former case, as the vehicle traverses an irregularity in a road surface, the shock absorber 20 and housing 26 will move upwardly within the chamber 68, thereby contracting the chamber 68 and forcing hydraulic fluid normally contained therewithin to the chamber 138 in the spring unit 124; however, the fluid flowing into the chamber 138 is resisted by the compressed gas within the chamber 140, with the result that the compressed gas acts as a spring means to resist the flow of fluid into the chamber 138 and thus resist upward movement of the shock absorber 20 and the housing 26 within the chamber 68. By properly selecting and controlling the volume and pressure of gas within the chamber 140, the spring rate of the suspension system may be readily controlled and changed or adjusted when desired, and once the chamber 140 has been initially charged or preloaded, the suspension system will be entirely maintenance free.

In the case wherein the suspension unit 12 is provided with the automatic leveling valve assembly 76, as shown in FIG. 2, the valve housing sections 102 and 104 are communicable with a source of pressurized actuating fluid and with a fluid reservoir, respectively, both of which are hereinafter described. During such time as the actuating fluid is not under pressure, the weight of the unsprung portion of the vehicle will bias the housing 28 downwardly until the bumper member 80 engages the upper end of the collar member 42. During such conditions, the coil spring 84 will force the valve spool member 106 upwardly within the bore 92 to a position wherein the passage 110 is in registry with the bore 98. At such times the pressure of the actuating fluid increases a predetermined amount, actuating fluid will flow through the bore 98 in the valve housing 90, and thereafter through the passage 110 and bore 112 in the spool valve member 106, and into the interior of the chamber 68. The fluid pressure within the chamber 68 will thereby increase and at a certain pressure will cause the housing member 28 to move upwardly with respect to the housing 26, thereby biasing the sprung portion of the vehicle supported on the unit 12 upwardly until said vehicle portion is disposed at a predetermined height, this height depending upon the weight of the vehicle and the pressure of air or gas within the chamber 140 of the associated spring unit. When the housing 28 reaches a predetermined height relative to the housing 26, an equilibrium condition will exist and the pressure of actuating fluid within the chamber 68 will not change as long as the weight of the vehicle remains unchanged. As the housing 28, and thus the valve housing 90 connected thereto, move upwardly relative to the housing 26, the passage 110 of the spool valve member 106 which is connected to the coil spring 84 will move out of alignment with respect to the bore 98, whereby the valve member 106 will block communication between the bore 98 and the chamber 68 to prevent any further actuating fluid from flowing into the chamber 68, thus maintaining the aforesaid equilibrium condition.

In the event the weight of the vehicle is decreased from the time of the equilibrium condition, the housing 26 will move upwardly due to the internal pressure within the chamber 68. When this occurs, the spool valve member 106 will remain at a relatively constant height with respect to upward movement of the valve housing 90. Accordingly, the passage 110 will move into registry with the bore 100 so that actuating fluid within the chamber 68 may flow upwardly through the bore 112 and thereafter through the bore 114 and the bore 100 in the housing 90. This actuating fluid will then be returned to the fluid reservoir through circuit means later to be described. It will thus be seen that the spool valve member 106 will move upwardly and downwardly within the bore 92 in accordance with the weight of the vehicle, and that as this weight changes, hydraulic actuating fluid will be either pumped to or from the chamber 68 to maintain the vehicle at a predetermined height regardless of the loading conditions imposed thereon.

It will be noted that in the event the vehicle traverses a road surface irregularity or bump, the shock absorber 20 and housing 26 will move upwardly with respect to the housing 28 for just a brief moment. By virtue of the damping characteristics provided by the chamber 94, the spool valve member 106 will be prevented from moving longitudinally within the bore 92 in response to a sudden change in pressure within the chamber 68 so that no actuating fluid will be communicated to or from the chamber 68.

For certain types of vehicle installations, the operatively associated suspension and spring units may be combined into individual unitized assemblies, whereby to facilitate assembly and operative mounting of these units. An exemplary embodiment of such a unitized assembly combining the principles of the suspension and spring units hereinbefore described is shown in FIG. 5 and generally designated by the numeral 158. Basically, the unit 158 is a combination of the suspension unit 12 shown in FIG. 2 and the spring unit 124 shown in FIG. 3, and all component parts of the unit 158 which are common to the above described units 12 and 124 are designated by like numerals having a prime (') suffix.

As illustrated in FIG. 5, the unit 158 comprises a basic telescopic, double acting shock absorber 20' having a pressure cylinder 22' enclosed within an outer tube 24' and provided with a reciprocable piston rod 30'. The unit 158 also comprises an inner housing 26' and an outer housing 28' having an upper housing section 58' and a lower housing section 60'. A flexible membrane or diaphragm member 50' has its inner periphery clampingly secured to the upper end portion 46' of the inner housing 26' by a clamping plate 52', the radially outermost portion of the diaphragm member 50' being clampingly secured between the housing portions 62' and 64' on the housing sections 60' and 58', respectively. The housing section 58' defines an internal chamber 68' which is closed at its lower end by the diaphragm member 50' and is communicable with the interior of the shock absorber 20' through suitable bores 160 formed in the collar member 42'. A cylindrical fluid fitting 161 is mounted within a suitable opening in the housing section 58' and is adapted to be communicable with suitable hydraulic circuitry connecting a pair of the units 158 which may, for example, be mounted on opposite ends of a vehicle axle, whereby the two units 158 are operated simultaneously to control the height of that portion of the vehicle supported upon the units 158. Such operation will be described in more detail in connection with the hydraulic circuitry incorporated in the leveling system 10 of the present invention. A helical coil spring 84' is provided within the chamber 68' circumjacent the piston rod 30' and adapted to be fixedly secured at its lower end by means of a suitable retaining plate 86'. The upper end of the housing section 58' is formed with a generally hemispherical cup-shaped sections 162 which is analogous to the housing section 134 of the spring unit 124, as will be apparent. The housing section 162 is formed with a generally C-shaped section 164 around the upper end thereof which is adapted to clampingly engage an outwardly extending flange portion 166 formed around the lower end of a cup-shaped housing section 132', whereby to fixedly secure the housing sections 162 and 132'. A flexible diaphragm member 136' divides the interior of the housing sections 162, 132' into upper and lower chambers 168 and 170, the radially outermost portion 146' of the diaphragm member 136' being clampingly secured between the housing portions 164 and 166. The housing section 162 is provided with a generally cup-shaped partition member 172, the outer periphery of which is nested within a recessed portion 174 in the housing section 162. The partition member 172 is formed with a central opening 176 and with radially outwardly disposed openings 178 and 180 which are adapted to communicate the interior of the chamber 170 with the chamber 68'. The housing section 162 is formed with a bleed opening 182 which is adapted to be normally closed by a suitable plug 184 threadably mounted in a fitting 186 secured to the outer surface of the housing section 162.

The chamber 168 is adapted to be filled or charged with compressed air or gas through a suitable valve assembly 188 that is mounted on the housing section 132', whereby to selectively control the relative volume of the chambers 168 and 170, as will be described. A longitudinally extending mounting stud or rod 190 is fixedly secured to the upper end of the housing section 132' by means of a suitable mounting plate 192 which is of a complementary configuration with respect to the upper end of the housing section 132' and is rigidly secured thereto, as by welding or the like. The mounting stud 190 is adapted to be secured to the body or other sprung portion of the vehicle, and an attaching member 36' on the lower end of the shock absorber 20' is adapted to be secured to an unsprung portion of the vehicle, such that actuation of the unit 158 will selectively control the attitude of the vehicle body relative to the unsprung portion.

The unit 158 is provided with a valve assembly 76' that is mounted on the radially inner surface of the housing section 58' and comprises valve housing 90' that defines a central longitudinally extending bore 92'. Reciprocally mounted within the bore 92' is a spool valve member 106' which is formed with a central recess 108' and a longitudinally extending bore 112' which is adapted to communicate a diametrically extending bore 114' with the interior of the chamber 68'. The housing 90' is formed with outwardly extending bores 98' and 100' which are aligned with suitable openings in the side of the housing section 58' and are communicable with hydraulic conduits 194 and 196 through suitable fluid fittings 198 and 200, respectively. Mounted on the upper end of the housing 90' is a generally cup-shaped cover member 202 having an orifice 204 formed in the upper end thereof and defining a compartment 206 with the upper end of the housing 90'. The compartment 206 is adapted to contain hydraulic fluid which acts as a damping means to limit reciprocal movement of the spool valve member 106' within the bore 92'. As was the case with the suspension unit 12, the lower end of the valve member 106' is fixedly secured to the uppermost convolution of the coil spring 84', as seen at 208.

The upper end of the piston rod 30' is adapted to be fixedly secured within the housing section 58' by means of a mounting bracket, best seen in FIG. 6 and generally designated by the numeral 210. The bracket 210 is formed with a central opening 212 in the lower end thereof through which the upper end of the piston rod 30' extends and is fixedly secured by means of suitable retaining means 214, 216 disposed on the upper side of the bracket 210. The radially outer ends of the bracket 210 are formed with mounting sections 218 and 220 which are adapted to be rigidly secured, as by welding or the like, to the inner periphery of the housing section 58', as seen at 222 in FIG. 6, with the result that the piston rod 30' is fixedly secured to the housing section 58' and any reciprocal movement of the section 58' will result in simultaneous movement of the piston rod 30'.

Generally speaking, operation of the combination suspension-spring unit 158 is identical to the operation of the suspension unit 12 and associated spring unit 124 hereinabove described. The primary difference between the two constructions resides in the fact that there is no fluid conduit means between the interior of the chamber 68' and the chamber 170 since hydraulic fluid is free to flow between these chambers through the openings 176, 178 and 180 in accordance with the pressure of air or gas within the chamber 168 and the specific loading conditions imposed upon the associated vehicle.

In order to provide for a source of pressurized hydraulic fluid for the leveling system 10, it is necessary to provide some type of hydraulic fluid reservoir and pumping means for selectively communicating fluid contained within the reservoir to and from the suspension units 12—18. By way of example, such means is illustrated in FIG. 1 and comprises a suitable fluid reservoir or tank 224 and fluid pump 226, the latter of which is adapted to operate during operation of the vehicle engine as, for example, through a suitable V-belt drive arrangement for transmitting motive power from the engine crank shaft to the pump 226. The pump 226 is communicable through a T-fitting which, for purpose of description, is representatively designated by $T_1$, and through a suitable fluid conduit 228 with a relief valve mechanism 230 which is in turn communicable with the reservoir 224 through a conduit 232. The valve 230 is adapted to permit the flow of hydraulic fluid from the pump 226 to the reservoir 224 only in the direction of the arrow 234 in FIG. 1 during such time as the spool valve member (s) 106 is disposed in a position blocking the flow of hydraulic actuating fluid to the suspension assemblies $S_1$—$S_4$, thereby assuring that the fluid pressure of the system 10 does not exceed a predetermined value. Thus, during the time the suspension assemblies $S_1$—$S_4$ are in a state of equilibrium or balance, hydraulic actuating fluid will be merely recirculated to and from the reservoir 224 by means of the pump 226. The pump 226 has suitable inlet and outlet conduits 236 and 238, respectively, the former of which is communicable with the conduit 228 through the T-fitting $T_1$, and the latter of which is communicable with the reservoir 224 through another T-fitting $T_2$ and a suitable conduit 240.

FIG. 7 illustrates an alternate means for supplying a source of hydraulic fluid to the suspension units 12—18. In this system, hydraulic fluid is adapted to be communicated to and from the inlet and outlet conduits 236 and 238, respectively, by means of a suitable pump 242 which is of substantially the same construction as the pump 226 with the exception that the pump 242 is actuatable upon energization of an associated electric motor 244 and pressure responsive switch mechanism 246. As illustrated, the switch mechanism 246 is communicable through a conduit 248 with the fitting $T_1$ and is adapted to control the flow of electric current to the electric motor 244 through conventional electric circuit means illustrated at 250 in FIG. 7. It will be noted that although in a preferred construction of the present invention the pump 242 is driven by the engine of the associated automotive vehicle, the pumping arrangement shown in FIG. 7 wherein the pump 242 is driven by the electric motor 244 will find certain useful application on vehicles wherein it is extremely difficult to mount the pump 242 adjacent the engine, thus requiring an auxiliary drive means such as the motor 244.

The leveling system 10 of the present invention incorporates a pair of load compensator devices 252 and 254 which generally function to control the flow of hydraulic actuating fluid between the suspension assemblies disposed along the opposite sides of the vehicle to control pitching movement of the vehicle body. The compensator devices 252, 254 are preferably identical in construction and operation so that a detailed description of the compensator 252 is applicable to the other of said devices 254.

As best seen in FIG. 9, the load compensator 252 comprises a pair of generally cup-shaped sections 256 and 258 which are disposed in mutual confronting relationship with each other. The housing sections 256, 258 are formed with outwardly extending flange portions 260 and 262 that are adapted to be clampingly secured to one another by means of a suitable C-shaped annular clamping ring 264 which extends around the housing sections 256, 258. A flexible membrane or diaphragm member 266, which is preferably fabricated of the same material as the diaphragm 50, is disposed within the housing sections 256, 258 and divides the interior of the compensator 252 into upper and lower chambers 268 and 270, respectively. The outer periphery of the diaphragm member 266 is formed with an enlarged thickness sealing section 272 which is adapted to be clampingly secured between the flange portions 260 and 262 and thereby provide a fluidtight seal at the juncture of the housing sections 256 and 258. The medial portion of the diaphragm member 266 is clampingly disposed between a pair of annular plates 274 and 276 which are rigidly secured to one another by a suitable screw, bolt or the like 278 and associated nut 280 which are disposed centrally of the compensator 252. A pair of helical coil springs 282 and 284 are disposed within the chambers 286 and 270, respectively, the outer ends of the springs 282, 284 abutting against the upper and lower ends of the housing sections 256 and 258, respectively. Suitable annular ridge portions 286 and 288 are formed in the housing sections 256, 258 for maintaining the outer ends of the coil springs 282, 284 centrally or coaxially arranged within the chambers 268 and 270. The inner ends of the springs 282, 284 are adapted to bear against the plates 274, 276, and a pair of annular ridge portions 290 and 292 are formed in the plates 274 and 276, respectively, for assuring that the inner ends of the springs 282, 284 are centrally located within the chambers 268, 270. As illustrated in FIG. 9, the diaphragm member 266 is somewhat larger in diameter than the interior of the chambers 268, 270 and is thereby adapted to flex upwardly and downwardly within the housing sections 256 and 258 in response to differential fluid pressure within the chambers 268, 270, as will later be described. Hydraulic fluid is adapted to be communicated to and from the chambers 268, 270 through fluid fittings 294 and 296 which are mounted within suitable aligned openings 298 and 300 in the housing sections 256 and 258, respectively.

In operation, the load compensators 252, 254 are adapted to be operatively associated with the suspension assemblies $S_1$, $S_3$ and $S_2$, $S_4$, respectively. More particularly and as illustrated in FIG. 1, the fittings 294 of the compensators 252, 254 are adapted to be communicable with the chambers 138 of the spring units 128 and 130 of the suspension assemblies $S_3$ and $S_4$, respectively. Similarly, the fittings 296 are adapted to be communicable with the chambers 138 of the spring units 124 and 126 of the suspension assemblies $S_1$ and $S_2$, respectively. During normal operating conditions, actuating fluid in the chambers 268 and 270 will maintain the diaphragms 266 in a predetermined position within the load compensators 252 and 254. This position is a function of the spring rate and free height of the coil springs 282 and 284 disposed within the chambers 268 and 270. When the fluid pressures on both sides of the diaphragms 266 are different, due to different loading conditions on the front and rear ends of the vehicle, the static position of the diaphragms 266 will be determined by the equilibrium between the fluid pressures and the spring forces. For example, when the fluid pressure within the chamber 268 is greater than the pressure within the chamber 270, the diaphragms 266 will move downwardly in FIG. 4 until a balanced condition exists.

When the front or rear wheels of the vehicle engage a road surface irregularity, a certain amount of actuating fluid will be forced from the suspension assemblies $S_1$, $S_2$ or $S_3$, $S_4$, through the hydraulic circuitry later to be described, to the chambers 268 or 270, depending upon which of the wheels engage the irregularity. For example, in a situation where the front wheels of the vehicle engage the irregularity, due to contraction of the suspension units 12 and 14, actuating fluid will flow from the suspension assemblies $S_1$, $S_2$ into the chambers 268 of the load compensators 252 and 254, respectively, with the result that the diaphragms 266 will move toward the chambers 270 to force actuating fluid out of the chambers 270. It will be apparent that during normal operating conditions, the amount of actuating fluid forced out of the chambers 270 will be equal to that forced into the chambers 268. This fluid which is forced from the chambers 270 will flow through suitable hydraulic circuitry into the suspension units 16 and 18 of the suspension assemblies $S_3$ and $S_4$, with the result that said units will expand and thereby elevate the rear end of the vehicle a predetermined amount. Thus, there is provided an interconnection between the front and rear suspension units of the vehicle which functions to maintain the attitude of the vehicle in a substantially horizontal configuration as the vehicle traverses a relatively irregular road surface. By virtue of the fact that either the front or rear pair of suspension units will expand in response to the other of said pair of units contracting upon engagement of the associated vehicle wheels with a surface irregularity, the pitching movement of the vehicle body usually attendant as the vehicle traverses irregular road surfaces is considerably reduced, thereby substantially enhancing the comfort of the vehicle ride. A particular feature of the above described load compensators 252 and 254 resides in the fact that a relatively level ride is maintained without an excessive flow of actuating fluid between the suspension units on the same side of the vehicle. This has been found to be particularly important under conditions of unequal loading between the front and rear ends of the vehicle.

Referring now to the hydraulic circuit incorporated in the leveling system 10 of the present invention, as illustrated in FIG. 1, the suspension assemblies $S_1$ and $S_3$ are adapted to be communicable through a suitable hydraulic conduit $C_1$, while the suspension assemblies $S_2$ and $S_4$ are communicable through conduit $C_2$. More particularly, the forward end of the conduit $C_1$ is connected to a conduit $C_3$ through a suitable T-fitting $T_3$, the conduit $C_3$ being connected to the fluid fitting 154 on the suspension unit 12. In a similar manner, the rear end of the conduit $C_1$ is connected through a T-fitting $T_4$ and a conduit $C_4$ with the fluid fitting 154 on the suspension unit 16. Thus, it will be seen that the chambers 68 of the suspension units 12 and 16 are communicable with each other. In a like manner, the forward end of the conduit $C_2$ is connected to the suspension unit 14 through a T-fitting $T_5$ and conduit $C_5$, while the rear end of the conduit $C_2$ is connected to the suspension unit 18 through T-fitting $T_6$ and conduit $C_6$. As illustrated, the load compensators 252 and 254 are communicable with the conduits $C_1$ and $C_2$, respectively, in a manner such that the rear ends of the conduits $C_1$, $C_2$ are communicable through the fittings 296 with the chambers 270, and the forward ends of the conduits $C_1$, $C_2$ are communicable with the chambers 268 through the fittings 294.

The suspension assemblies $S_1$ and $S_2$ are adapted to be communicable through conduit $C_7$ which extends between the fittings $T_3$ and $T_5$, and the suspension assemblies $S_3$ and $S_4$ are communicable through conduit $C_8$ which extends between fittings $T_4$ and $T_6$. The housing sections 102 of the valve assemblies 76 associated with the suspension units 12 and 14 are communicable through conduit $C_9$, and the housing sections 104 of said valve assemblies 76 are communicable through conduit $C_{10}$. Similarly, the housing sections 102 of the valve assemblies 76 associated with the suspension units 16 and 18 are communicable through conduit $C_{11}$, and housing sections 104 of said valve assemblies are communicable through conduit $C_{12}$. Finally, the conduits $C_{11}$ and $C_9$ are communicable with the fluid outlet line 238 through conduit $C_{14}$ which is connected at its forward end through a T-fitting $T_7$ with the conduit $C_9$, and at its rear end with the conduit $C_{11}$ through a T-fitting $T_8$. The fluid outlet line 238 is communicable with the conduit $C_{14}$ through T-fitting $T_9$, and likewise, the fluid inlet line 236 is communicable with the conduits $C_{10}$ and $C_{12}$ through conduit $C_{15}$ which is connected at its upper end through T-fitting $T_{10}$ with conduit $C_{10}$, and at its lower end with conduit $C_{12}$ through T-fitting $T_{10}$. The fluid inlet line 236 is communicable with a medial portion of the conduit $C_{15}$ through T-fitting $T_{12}$. As illustrated in FIG. 1, the spring units 124 and 126 are communicable with the conduits $C_3$ and $C_5$ through T-fittings $T_{13}$ and $T_{14}$, respectively, and the spring units 128 and 130 are communicable with the conduits $C_4$ and $C_6$ through T-fittings $T_{15}$ and $T_{16}$, respectively.

To facilitate correlating the various suspension assemblies $S_1$-$S_4$ and the other component parts of the leveling system 10, a brief description of the overall operation thereof will now be given.

Assuming the condition that the spring units 124—130 are charged with a predetermined volume of pressurized gas, initially, the vehicle engine is energized, resulting in actuation of the pump 226 to maintain actuating fluid at a predetermined fluid pressure in the fluid outlet line 238. Upon actuation of the pump 226, pressurized fluid is communicated through the conduits $C_{14}$, $C_8$ and $C_9$ to the suspension assemblies $S_1$, $S_2$ and $S_3$, $S_4$, and more particularly to the housing sections 102 of the valve assemblies 76 associated with the suspension units 12—14. As previously mentioned, during the time the actuating fluid is not under pressure, the weight of the vehicle biases the housings 28 downwardly, with the result that the coil springs 84 maintain the passages 110 of the valve members 106 in registry with the bores 98. As the fluid pressure increases, the actuating fluid will flow from the fluid outlet line 238 through the conduits $C_{14}$, $C_8$ and $C_9$ into the chambers 68 of the suspension units 12—14. The increase in fluid pressure within the chambers 68 will cause the housing members 28 to move upwardly with respect to the housing 26 until a state of equilibrium is achieved between the fluid pressure within the chambers 68 and the gas or air pressure within the spring units 124—130. The vehicle body will thereby be maintained in a substantially horizontal attitude regardless of the loading conditions imposed thereon. That is, the fluid pressure within the chamber 68 of the suspension units 12—18 will remain in equilibrium with the gas or air pressure within the chambers 140 of the spring units 124—130. At such time as the loading conditions imposed on the vehicle are changed, for example, when the rear end of the vehicle is heavily loaded, the suspension units 16 and 18 will be compressed under the increase in weight, whereby the housings 28 will move downwardly, with the result that the passages 110 of the spool valve members 106 will move into registry with the bores 98. When this occurs, actuating fluid will be pumped into the chambers 68 to effectuate expansion of the units 16 and 18 to a position wherein the rear end of the vehicle body is raised to a position wherein the body is disposed in a level attitude.

At such time as the aforesaid load on the rear end of the vehicle is removed or reduced in magnitude, the suspension units 16 and 18 will expand slightly due to the fluid pressure within the chambers 68 thereof. As this occurs, the valve housings 90 will move upwardly along with the housings 28 until such time as the passages 110 register with the bores 98, with the result that actuating fluid will flow out of the chambers 68 of the units 16, 18 and back to the inlet conduit 236 through the conduits $C_7$, $C_{12}$ and $C_{15}$, as illustrated in FIG. 1. It will thus be seen that the suspension units $S_1$—$S_4$ will automatically function to maintain the vehicle body in a level attitude, regardless of the loading conditions imposed thereon.

As illustrated, the load compensators 252 and 254 are operatively connected in the leveling system 10 by means of the conduits $C_1$ and $C_2$ which are communicable with the conduits $C_3$ and $C_5$ at the forward end of the vehicle and with the conduits $C_4$ and $C_6$ at the rear end of the vehicle. Accordingly, the front and rear suspension assemblies $S_1$, $S_2$ and $S_3$, $S_4$, respectively, are interconnected along the opposite sides of the vehicle. As previously mentioned, by thus interconnecting the suspension assemblies along the same sides of the vehicle, when the front wheels of the vehicle engage an object, actuating fluid from the front suspension assemblies $S_1$, $S_2$ will be communicated through the conduits $C_1$ and $C_2$ toward the rear suspension assemblies $S_3$, $S_4$, and vice versa, in order to maintain the vehicle in a level attitude and to reduce any pitching movement of the vehicle body as the vehicle traverses irregular road surfaces. By virtue of the provision of the load compensators 252 and 254, the quantity of actuating fluid which flows through the conduits $C_1$ and $C_2$ is minimized.

A particular feature of interconnecting the front and rear suspension assemblies along each side of the vehicle resides in the fact that a lower spring rate is achieved since both the spring units on the same side of the vehicle will function to receive actuating fluid from one of the suspension units. This will be achieved with or without the provision of the load compensators 252, 254, and the end result is that a smooth and comfortable ride is achieved by reducing the spring rate and a substantial amount of any pitching movement of the vehicle body.

It will be seen that the suspension assemblies $S_1$, $S_2$ and $S_3$, $S_4$ are interconnected by means of the conduits $C_7$ and $C_8$, respectively, whereby the suspension assemblies at the opposite sides of the vehicle are interconnected. The purpose of such an interconnection is to enable both spring units at the front or rear end of the vehicle to absorb actuating fluid from one of the suspension units on that end of the vehicle, whereby to minimize the spring rate of the leveling system. Although in theory such an arrangement permits a reduction in spring rate of up to 50 percent, it will be apparent that such a theoretical value will seldom be achieved since the interconnecting conduits offer at least a certain amount of resistance to the free flow of actuating fluid between the suspension assemblies. The results of interconnecting the front and rear suspension assemblies $S_1$, $S_2$ and $S_3$, $S_4$ through the conduits $C_7$ and $C_8$ is that rolling movement of the vehicle body is considerably reduced as the vehicle traverses an irregular road surface. For example, when one of the left wheels of the vehicle engages an object, the suspension unit adjacent that wheel will be compressed and the left side of the vehicle will have a tendency to be elevated. Due to the compression of the left unit, a certain quantity of actuating fluid will flow through the conduits $C_7$ and/or $C_8$ to the suspension unit on the right side of the vehicle. Assuming that the load on the suspension units on the right side of the vehicle remains unchanged, the additional actuating fluid that is communicated thereto will result in expansion of the right hand unit, thus lifting the right side of the vehicle, with the result that the car will be lifted on both sides instead of rolling as the vehicle wheels engage an object.

Although the leveling system 10 of the present invention shown in FIG. 1 embodies a number of different features such as the front and rear interconnection of suspension units, side by side interconnection of suspension units, load compensators, and automatic leveling valves, the present invention is not intended to be limited in scope to a single system combining all of these features. Instead, it is contemplated that the system 10 may be modified in a number of different ways by omitting one or more of the aforesaid features, and that such modified systems will operate in accordance with the basic principles of the leveling system 10 hereinabove described. By way of example, several different ways in which the basic system 10 can be modified are hereinafter described, with each of the modified systems incorporating the fundamental teachings of the leveling system 10 so that particular reference will be made to FIG. 1 wherein the system 10 is illustrated.

One example of how the leveling system 10 may be modified is to omit the load compensators 252, 254 and the conduits $C_1$ and $C_2$ which communicate the suspension assemblies at the front and rear end of the vehicle along the opposite sides thereof. Such a modified system will operate in essentially the same manner as the leveling system 10, with the exception that actuating fluid will not be communicated between the suspension assemblies at the front and rear ends of the vehicle. Accordingly such a modified system will not give as comfortable a ride as is provided by the system 10 since there is no means provided for reducing pitching movement of the vehicle body.

Another example of how the leveling system 10 may be modified is to omit the automatic leveling valve assembly 76 on the suspension units at either the front or rear end of the vehicle, and to omit the attendant conduits $C_9$, $C_{10}$ or $C_{11}$, $C_{12}$ interconnecting the valve assemblies at the front and rear end of the vehicle. With this arrangement, the automatic leveling feature is provided at only one end of the vehicle, although the advantages of interconnecting the suspension assemblies along the opposite ends of each axle are retained. It will be apparent, of course, that in such a system, the conduits $C_{14}$ and $C_{15}$ will be communicable only with those conduits $C_9$, $C_{10}$ or $C_{11}$, $C_{12}$ extending between the existing valve assemblies 76. It is contemplated that this system will be particularly applicable wherein the loading conditions on one end of the vehicle remain relatively constant.

Still another example of how the leveling system 10 may be modified is to omit the two suspension assemblies and attendant fluid circuitry at one end of the vehicle. For example, the front end of the vehicle may have the suspension assemblies $S_1$ and $S_2$ omitted and replaced with conventional vehicle springs and/or shock absorbers, with the result that the pump 226 and reservoir 224 will be communicable through the inlet and outlet lines 236 and 238, respectively, with only the suspension assemblies $S_2$ and $S_4$ at the rear end of the vehicle. It will be apparent, of course, that such an arrangement is not provided with the aforedescribed front and rear interconnection to reduce pitching movement of the vehicle body. It is contemplated that this type of system will find particularly useful application in the replacement market or where it is desired to augment the suspension system of a vehicle so that the vehicle will be adapted to carry relatively heavy loads at the rear end thereof.

Yet another example of how the leveling system 10 may be modified is to entirely omit the leveling valve assemblies 76 on each of the suspension units 12—18, and to omit the pump 226 and reservoir 224 and the fluid conduits $C_9$, $C_{10}$, $C_{11}$, $C_{12}$, $C_{14}$ and $C_{15}$ which communicate the valve assemblies 76 with each other and with the pump 226. This arrangement provides a leveling system comprising the four suspension assemblies $S_1$—$S_4$ with the conduits $C_3$, $C_5$ and $C_7$ connecting the assemblies $S_1$ and $S_2$, and conduits $C_4$, $C_6$ and $C_8$ connecting the assemblies $S_3$ and $S_4$. Also, this arrangement includes the conduits $C_1$ and $C_2$ interconnecting the suspension assemblies at the front and rear end of the vehicle along the opposite sides thereof. Depending on the type of application, such a system may or may not be provided with the load compensators 252, 254, and/or have the conduits $C_7$ and $C_8$ omitted, whereby to control the roll and pitch reducing characteristics of the system.

Together with the above-described examples of how the leveling system 10 may be modified, it will be noted that the basic spring and suspension units (or combined units), along with the automatic leveling valve assemblies 76, may be used as suspension components in various other types of applications. It is contemplated that the combined units may be applied in virtually every instance where a suspension-spring device is required, in either a horizontal, vertical or inverted application. Since the size of the units may be adjusted to suit any loading conditions, and the size of the preload charge of air or gas may be preselected so that any spring rate is achieved, such units will find universality of application. Use of the load compensators 252, 254 is also not limited to the above-described leveling system, and it is contemplated that such devices can be used virtually anywhere it is desired to connect two separate hydraulic systems having different operating pressures.

It may be possible in the leveling system 10 illustrated in FIG. 1 to obtain special suspension characteristics by incorporating certain restricted orifices or valves in the system. For example, restricted orifices may be provided in the leveling system 10 at the locations designated by the numeral 302. By choosing the orifices of a predetermined restrictive size, it is possible to reduce the flow of actuating fluid without adversely affecting the automatic leveling characteristics of the system. As another alternative, the suspension units at the front and rear ends of the vehicle may be connected with the conduits $C_1$ and $C_2$ through hydraulic conduits 304, 306, 308 and 310, as indicated by the dotted lines in FIG. 1, whereby to enhance the pitch reducing characteristics of the leveling system 10.

FIGS. 8 and 9 illustrate two additional embodiments of the present invention wherein operatively associated suspension and spring units are combined into individual unitized assemblies in a manner similar to the assembly 158 illustrated in FIG. 5. Generally speaking, the assemblies illustrated in FIGS. 8 and 9 are adapted to function in essentially the same manner as the unit 158; however, these two additional designs differ from the unit 158 in that the air spring or accumulator chamber 168 that is installed as an upper part of the unit 158 is now integrated in the form of a cylindrical jacket around the unit itself. The primary advantage of the designs illustrated in FIGS. 8 and 9 is that the total amount of required installation space is reduced substantially, thereby providing for ease in installation, as well as for universality of application in vehicles where space is at a premium.

Referring now in detail to FIG. 8 of the drawings, a suspension unit, generally designated 400, is shown as comprising a basic telescopic, double-acting shock absorber 402 having a pressure cylinder 404 enclosed within an outer tube 406 and provided with a reciprocable piston rod 408. The unit 400 also comprises an elongated, generally cylindrical-shaped inner housing 410 arranged coaxially of the shock absorber 402 and an outer housing 412. A flexible membrane or diaphragm 414 is provided interjacent the outer tube 406 and inner housing 410 and has an inner periphery section thereof clampingly secured to the upper end of the outer tube 406 by means of a suitable annular clamping ring 416, the radially outermost portion of the diaphragm 414 being clampingly secured between a second annular clamping ring 418 and a radially inwardly projecting crimped or similarly deformed portion 420 of the inner housing 410. The upper end of the inner housing 410 defines an annular chamber 422 which is closed at its lower end by means of the diaphragm 414 and is communicable with the interior of the shock absorber 402 through an annular passage 424 defined between the outer periphery of the pressure cylinder 404 and the inner periphery of the outer tube 406.

The upper end of the chamber 422 is closed by a generally radially extending flange section 426 integrally formed on the lower end of a combination valve and manifold housing, generally designated 428, the section 426 being formed with a cylindrical surface portion 430 to which the upper end of the inner housing is fixedly secured by means of a plurality of circumferentially spaced, radially inwardly projecting screws, bolts, rivets, or the like 432. The radially outer edge of the flange section 426 is formed with an annular radially inwardly extending recessed portion 434 within which an enlarged thickness bead section 436 formed on the upper end of a generally cylindrical-shaped flexible diaphragm member 438 is clampingly and sealingly secured by means of a suitable annular clamping ring 440. The diaphragm 438 extends coaxially around the outer periphery of the inner housing 410 and separates the radial spacing between the inner housing 410 and outer housing 412 into a pair of concentrically oriented inner and outer chambers 442 and 444, the former of which is communicable with the chamber 422 through a plurality of circumferentially and axially spaced openings or ports 446 formed in the upper end of the inner housing 410. The lower end of the inner housing 410 is adapted to be secured as by welding or the like within an annular recessed portion 448 of a generally ring-shaped closure plate 450 which is also formed with an annular radially inwardly extending recessed portion 452 around the outer periphery thereof. The recessed portion 452 is adapted to receive and sealingly engage an enlarged thickness bead section 454 formed around the lower end of the cylindrical diaphragm 438, which bead section 454 is adapted to be clampingly maintained within the recessed portion 452 by a generally radially inwardly disposed sealing section 456 formed around the lower end of the outer housing 412 and adapted to be fixedly and sealingly engaged with the outer periphery of the bead section 454, whereby to provide a fluidtight seal around the outer chamber 444. The upper end of the outer housing 412 is adapted to be secured by means of welding or the like to a generally cylindrically extending flange portion 458 of an upper closure plate generally designated 460. The plate 460 is adapted to be clampingly disposed interjacent a generally radially extending mounting section 462 formed on the upper end of the housing 428 and a lower end section 464 of a combination fluid inlet housing and mounting bracket, generally designated 466. As illustrated, means in the form of suitable screws, bolts, or the like 468 extend through suitable axially extending openings 470 in the member 466 and are threadably received within suitable axially aligned bores 472 in the mounting section 462 for securing the member 466 to the housing 422. A suitable O-ring seal 474 is preferably provided interjacent the upper side of the mounting section 462 and lower side of the plate 460 in order to provide a fluidtight seal therebetween. It will be seen that the upper end of the member 466 is formed with an annular bore 476 which is adapted to cooperate with the ringlike attaching member 478 on the lower end of the shock absorber 402 in operatively supporting the unit 400 on the associated vehicle. The bore 476 is adapted to function in essentially the same manner as the mounting stud 190 of the suspension unit 158 in securing the upper end of the unit 400 to the body or other sprung portion of the associated vehicle.

The member 466 is provided with a pair of fluid inlet fittings 480 and 482, the former of which is communicable through a fluid passage 484 and a generally longitudinally extending fluid passage 486 in the housing 428 with the interior of the chamber 422. It will be noted that suitable O-ring sealing means 488 is preferably provided at the juncture of the member 466 and the housing 428. The fluid fitting 480 is adapted to be communicable with suitable hydraulic circuitry connecting a pair of the units 400 which may, for example, be mounted on opposite ends of a vehicle axle, whereby the two units 400 will operate simultaneously to control the relative height of that portion of the vehicle supported by the units 400. Such operation was hereinbefore described in connection with the overall operation of the leveling system of the present invention. During operation of the suspension unit 400, hydraulic fluid will be communicated from the fitting 480 interiorly of the chamber 422 and thereafter through the openings 446 to the chamber 442, with the result that the chamber 422 will function in essentially the same manner as the chamber 170 of the aforedescribed suspension unit 158.

The outer housing 412 is provided with a suitable air valve assembly 490 adjacent the lower end thereof, which valve assembly 490 is adapted to function in filling or charging the chamber 444 with compressed air or gas, whereby the chamber 444 will function in the same manner as the air chamber 168 of the suspension unit 158. As will be apparent, the pressure level of the compressed air or gas within the chamber 444 will control the relative volume of hydraulic fluid within the chamber 442.

The upper end of the piston rod 408 is adapted to be threadably received within an annular bore 492 which is formed in the lower end of the housing 428, with the result that the piston rod 408 is rigidly secured through the housing 428 to the member 466. Accordingly, relative upward or downward movement of the member 466 in response to corresponding movement of the sprung portion of the associated vehicle will be transmitted through the piston rod 408 to the shock absorber 402 in order to effect proper damping of such upward or downward movement.

A helical coil spring 494 is provided within the chamber 422 circumjacent the piston rod 408 and is adapted to be fixedly secured at its lower end by means of a suitable retaining bracket, generally designated 496 that is attached to the upper end of the shock absorber 402. The uppermost convolution of the spring 494 is fixedly secured to the lower end of a generally vertically reciprocable spool valve member 498 which is slidably mounted within a suitable sleeve bushing or the like 500 disposed within a vertically extending bore 502 in the housing member 428. It will be noted that suitable O-ring sealing means 504 are provided interjacent the opposite sides of the plate 460 and the housing 428 and member 466 to provide a fluidtight seal therebetween. The spool valve 498 is formed with a central longitudinally extending bore 506 which is adapted to communicate the generally diametrically extending bore 508 with a pair of inlet and outlet fluid passages (not shown). One of these passages is communicable through a pair of longitudinally aligned fluid passages 510 and 512 in the member 466 and housing 428 with the fluid fitting 482, and the other of the fluid passages is communicable similarly with another fluid fitting (not shown) disposed adjacent the fitting 482. The fitting 482 and the associated fitting which is not illustrated herein are analogous to the fittings 198 and 200 of the suspension unit 158, whereby the valve 498 is adapted to connect the interior of the unit 400 with either the pressure conduit or return flow conduit (i.e., conduits $C_{14}$ and $C_{15}$ of the system shown in FIG. 1) of the associated suspension system.

FIG. 9 illustrates a suspension unit, generally designated 513 which is similar in construction and operation with the unit 400, with the exception that the unit 513 is not provided with an automatic leveling valve, and that a number of component parts thereof are designed such that they may be manufactured in accordance with electromagnetic forming techniques, as will be described. More particularly, the suspension unit 513 is shown as comprising a telescopic, double-acting shock absorber 514 having a pressure cylinder 515 enclosed within an outer tube 516 and having a reciprocable piston rod 517. The unit 513 also comprises a cylindrical inner housing 518 arranged coaxially of the shock absorber 514, and a cylindrical outer housing 519 which is concentric with and spaced radially outwardly from the inner housing 518. A flexible membrane or diaphragm 520 is provided interjacent the outer tube 516 and the inner housing 518 and has an inner peripheral section thereof clampingly secured to the upper end of the tube 516 by means of a suitable annular clamping ring 521, the outer periphery of the diaphragm 520 being clampingly secured adjacent a radially outwardly projecting embossed portion 522 formed adjacent the lower end of a generally cup-shaped upper housing, generally designated 523 which defines a central chamber 524. The lower end of the chamber 524 is closed by means of the diaphragm 520, and the interior of the chamber 524 is communicable with the interior of the shock absorber 514 through an annulus 525 provided in the upper end thereof.

The upper end of the upper housing 523 is formed with a generally radially extending flange section 526 which is adapted to be sealingly engaged with the lower end of a generally cylindrical-shaped support member 528. As illustrated, suitable sealing means in the form of an annular O-ring or the like 530 is provided interjacent the lower end of the member 528 and the flange section 526. The member 528 is formed with an annular recessed portion 532 around an intermediate portion thereof, which recessed portion 532 is adapted to have an upper end section 534 of a generally cylindrical-shaped flexible diaphragm member 536 clampingly secured thereto by means of a suitable annular clamping ring or the like 538. The diaphragm 536 extends coaxially around the outer periphery of the upper housing 523 and separates the radial spacing between the housing 523 and the outer housing 519 into a pair of concentrically oriented inner and outer chambers 542 and 544, the former of which is communicable with the interior of the chamber 524 through a plurality of openings or perforations 546 formed in the upper housing 523. The lower end of the diaphragm 536 is adapted to be clampingly and sealingly secured to the outer periphery of the upper end of the inner housing 518 by means of a suitable clamping ring 548. The lower end of the outer housing 519 is formed with a radially inwardly and downwardly inclined section 550 which is adapted to close the lower end of the chamber 544 and be secured as by welding or the like 552 to the lower end of the inner housing 518. A generally radially extending upper closure plate 554 is secured as by welding or the like to the upper end of the outer housing 519 and is thereby adapted to close the upper end of the chamber 544. The lower end of the inner chamber 542 is adapted to be closed at the juncture of the lower end of the diaphragm 536 and the inner housing 518, with the upper end of the housing 518 being fixedly secured as by welding or the like to the outer periphery of the embossed portion 522 of the upper housing 523.

It will be noted that although the suspension unit 513 may be manufactured in accordance with a variety of well-known production techniques, the assembly 513 is particularly designed such that various component parts thereof may be assembled by electromagnetic forming procedures. For example, the clamping rings 521, 538 and 548 may be assembled on the unit 513 by such electromagnetic forming operations.

The radially innermost portion of the plate 554 is adapted to be clampingly secured between the upper end of the member 528 and the lower side of a generally hollow cylindrical fluid manifold member 556 which is formed with a fluid fitting section 558 adapted to be connected to a suitable source of hydraulic fluid in the same manner as the fluid fitting 480 of the suspension unit 400. Hydraulic fluid is adapted to be communicated from the fitting section 558 through a central bore 560 formed in the member 528 to the interior of the chamber 524. It will be seen that the bore 560 is somewhat oversize and has the upper end of the piston rod 517 projecting upwardly therethrough to the upper end of the member 558. The upper end of the piston rod 517 is provided with a vertically upwardly extending mounting stud section 562 which extends upwardly through a pair of mounting plates 564 and 566 for operatively securing the upper end of the unit 513 to a suitable structural member 568 of the associated vehicle. It will be seen that a pair of resilient shock absorbing pads or bushings 570 and 572 are provided interjacent the mounting plates 564, 566 and the opposite sides of the structure 568, the bushings 570, 572 thereby serving to prevent road bumps and jars from being transmitted to the associated vehicle. Means in the form of a pair of locking nuts 574 are provided on the upper end of the stud section 562 for operatively securing the upper end of the unit 513 to the vehicle. As will be apparent, the lower end of the shock absorber 514 is provided with a mounting ring 576 for securing the lower end of the unit 513 to an unsprung portion of the vehicle.

In operation, the outer chamber 544 is adapted to be charged with a preselected volume of pressurized air or gas, whereby the chamber 544 will function in the same manner as the air chamber 168 of the suspension unit 158. Suitable conventional valve means (not shown) may, of course, be utilized for charging the chamber 544, as will be apparent. It will be noted that although the suspension unit 513 is not illustrated herein as being provided with an automatic leveling valve, such a valve could be readily incorporated therein in order to adapt the unit 513 for automatic leveling applications. Alternatively, a separate leveling valve could be operatively associated with the unit 513 where automatic leveling is desired. Such a separate valve could be, for example, mounted along the center line of the vehicle and regulate the hydraulic fluid flow to and from a pair of suspension units 513, in a manner similar to the system illustrated in FIG. 1.

It will be seen from the foregoing description that the present invention provides a new and improved vehicle leveling system which is adapted to overcome the problems heretofore encountered in previously known and used suspension systems having conventional leaf springs, coil springs, air cylinders or relatively complex hydraulic piston and cylinder devices. More particularly, the present invention provides a leveling system that is characterized by a low spring rate and which is adapted to minimize any rolling or pitching movement of the vehicle body as the vehicle traverses a relatively bumpy road, the automatically leveling feature of the system 10 functioning to maintain the vehicle body at a predetermined height regardless of the loading conditions imposed thereon. One particularly important feature of the present invention resides in the provision of the spring units which may be precharged with pressurized gas so as to selectively and adjustably control the spring rate of the vehicle. Another feature of the present invention resides in the provision of the road compensators which minimize the quantity of actuating fluid transmitted between the suspension assemblies along the same side of the vehicle, yet minimizing to the extreme any pitching movement of the vehicle body. Still another feature of the present invention resides in the fact that the various components parts thereof may comprise thin-walled stampings, as opposed to forged or machined parts of the type incorporated in heretofore known and used vehicle suspension systems, thereby minimizing manufacturing expenses. In addition to the above features, the present invention utilizes the system's actuating fluid for the associated shock absorbers, thereby substantially eliminating cavitation and aeration noise that occurs in conventional shock absorbers under certain operating conditions. One additional feature of the present invention which is of particular importance resides in the fact that the leveling system 10 may have the various component sections or members thereof omitted for certain types of installations, thereby providing for universality of application.

While it will be apparent that the embodiments illustrated herein are well calculated to fulfill the objects above stated, it

I claim:

1. In a leveling system for controlling the attitude between first and second portions of a vehicle,
   shock absorber means adapted for attachment to one of the vehicle portions,
   first housing means defining a fluid chamber and adapted for attachment to the other of the vehicle portions, means for communicating actuating fluid to said chamber, whereby expansion and contraction of said chamber will effect preselected changes in attitude between said first and second vehicle portions,
   second housing means containing a preselected volume of pressurized gas,
   a generally cylindrically shaped flexible partition arranged generally coaxially of said shock absorber and having one side thereof communicable with said fluid chamber and the opposite side thereof communicable with said volume of gas, whereby
   contraction of said fluid chamber will result in fluid being transmitted out of said chamber and thereby bias said partition means toward said second housing means against the resistance of the pressurized gas therewithin,
   one of said housing means being disposed in generally surrounding relation with respect to the other of said housing means.

2. A vehicle leveling system as set forth in claim 1 which includes flexible diaphragm means extending between said first housing means and said shock absorber means and which defines a portion of said fluid chamber.

3. A leveling system as set forth in claim 1 which includes valve means for selectively communicating actuating fluid to and from said fluid chamber.

4. A leveling system as set forth in claim 3 wherein said valve means is actuable in response to relative movement between said first housing means and said shock absorber means.

5. A leveling system as set forth in claim 3 wherein said valve means comprises a valve housing defining a valve bore, a valve member reciprocable within said bore, inlet and outlet passage means for communicating actuating fluid to and from said bore, and means for moving said valve member into alignment with said passage means in response to relative movement between said first housing means and said shock absorber means.

6. A leveling system as set forth in claim 5 which includes spring means disposed within said fluid chamber and connected to said valve member for biasing said member within the said bore in response to relative movement between said first housing means and said shock absorber means.

7. A leveling system as set forth in claim 5 which includes damping means for limiting movement of said valve member within said bore.

8. In a leveling system for controlling the attitude between the sprung and unsprung portions of a vehicle,
   a pair of suspension assemblies each including a suspension unit and an associated spring unit, said suspension units each comprising a hydraulic direct-acting shock absorber and a first housing means defining a fluid chamber, means for securing a first portion of each of said units to the unsprung portion of the vehicle and a second portion of said units to the sprung portion of the vehicle,
   said spring units each comprising a second housing means and a generally cylindrically shaped flexible partition means dividing the interior thereof into first and second compartments, said second housing means generally surrounding said housing means of the associated of said suspension units,
   said first compartments of said spring units being charged with a preselected volume of pressurized gas,
   said second compartments of said spring units being communicable with the fluid chamber of the associated suspension unit and each of said second compartments and said fluid chambers being communicable with a source of actuating fluid, with said fluid acting against one side of said partition means and said pressurized gas acting against the opposite side of said partition means, whereby contraction of said fluid chambers upon relative movement of said first and second portions thereof will result in fluid being transmitted to said second compartments of said spring units to bias said partition means toward said first compartments against the resistance of the pressurized gas within said first compartments.

9. A leveling system as set forth in claim 8 which includes fluid conduit means communicating said fluid chambers of each of said suspension units, whereby contraction of one of said fluid chambers results in actuating fluid being transmitted to the fluid chamber of the other of said suspension units.

10. A leveling system as set forth in claim 9 wherein said suspension assemblies are mounted at the front and rear end of the vehicle along the same side thereof to reduce pitching movement of the sprung portion of the vehicle.

11. A leveling system as set forth in claim 9 wherein said suspension assemblies are mounted at one end of the vehicle adjacent the opposite sides thereof, whereby to reduce rolling movement of the sprung portion of the vehicle.

12. A leveling system as set forth in claim 9 which includes fluid conduit means communicating said second compartments of said spring units, whereby contraction of one of said fluid chambers results in actuating fluid being transmitted to said second compartment of the spring units of each of said suspension assemblies, whereby to reduce the spring rate of said assemblies.

13. A leveling system as set forth in claim 9 which includes load compensator means communicable with the fluid chamber of each of said suspension units, said load compensator means comprising first and second fluid compartments and means for forcing fluid from one of said compartments in response to an increase in fluid pressure in the other of said compartments.

14. A leveling system as set forth in claim 8 which includes valve means for selectively communicating actuating fluid to and from said fluid chamber of each of said suspension units.

15. A leveling system as set forth in claim 14 wherein said valve means is actuable in response to relative movement between said vehicle sections, and which includes a source of pressurized actuating fluid and means for communicating said source with said valve means.

16. A leveling system as set forth in claim 15 wherein said source of pressurized actuating fluid comprises a fluid reservoir and pump means for pumping actuating fluid between said reservoir and said suspension assemblies.

17. A leveling system as set forth in claim 8 which includes first and second pairs of suspension assemblies each comprising one of said spring units, said first and second pair of suspension assemblies being disposed at the front and rear ends of the vehicle along the opposite sides thereof, and which includes conduit means communicating in suspension assemblies along the same sides of the vehicle, whereby to reduce pitching movement of the sprung portion of the vehicle.

18. In a suspension unit for a vehicle having sprung and unsprung portions,
   first housing means defining a variable volume fluid chamber,
   leveling means for varying the attitude between said vehicle portions in response to changes in the volume of said fluid chamber,
   second housing means defining a pressurized gas chamber,
   one of said housing means being disposed in substantial surrounding relation with respect to the other of said housing means, and
   flexible partition means having fluid communicable with said fluid chamber acting against one side thereof and pressurized gas communicable with said gas chamber acting against the opposite side thereof.

19. In a suspension system,
a suspension unit comprising a generally cylindrically shaped outer housing member,
first and second attachment means spaced axially of said housing member and adapted to be secured to two relatively movable members,
a generally cylindrically shaped flexible partition member extending axially within said housing member and separating the interior thereof into first and second radially adjacent chambers,
said first chamber being charged with a preselected quantity of pressurized gas and said second chamber having a volume of actuating fluid therein, and
means including a source of actuating fluid communicable with said second chamber and adapted to act against one side of said partition member for varying the axial spacing between said attachment means in response to changes in volume of said actuating fluid in said second chamber.

20. A suspension system as set forth in claim 19 wherein said first chamber extends at least partly around said second chamber, and wherein expansion of said second chamber is resisted by said pressurized gas in said first chamber.

21. In a vehicle leveling apparatus,
a direct-acting hydraulic shock absorber,
a generally cylindrical housing arranged concentrically of said shock absorber,
first attachment means for securing one end of said shock absorber to one portion of a vehicle and second attachment means for securing one end of said housing to another portion of the vehicle,
a flexible diaphragm member extending between said shock absorber and said housing and defining therewith a first fluid chamber,
an air spring unit disposed in generally surrounding relationship with respect to said housing,
said unit comprising a second fluid chamber and a gas chamber separated by a flexible partition,
said first and second fluid chambers being communicable with one another, whereby
contraction of said first fluid chamber will result in fluid being transmitted out of said first fluid chamber to said second fluid chamber and bias said partition means toward said gas chamber against the resistance of the pressurized gas therewithin.

UNITED STATES PATENT OFFICE
CERTIFICATE OF CORRECTION

Patent No. 3,582,106  Dated June 1, 1971

Inventor(s) Johan H. Keijzer

It is certified that error appears in the above-identified patent and that said Letters Patent are hereby corrected as shown below:

In the Abstract, line 2, "spring" should read -- sprung --.

Column 6, line 6, "space" should be --spacer--. Column 8, line 27, "times" should be --time as--. Column 11, line 46, after "cup-shaped" insert --housing--. Column 22, line 57, after "ing" insert --one of said suspension units and--. Column 22, line 60, "in" should be --the--.

Signed and sealed this 18th day of January 1972.

(SEAL)
Attest:

EDWARD M. FLETCHER, JR.  ROBERT GOTTSCHALK
Attesting Officer  Acting Commissioner of Patents